(No Model.)

F. W. KASCH.
WRENCH.

No. 433,794. Patented Aug. 5, 1890.

WITNESSES:
John M. Deemer
C. Sedgwick

INVENTOR:
F. W. Kasch
BY Munn & Co.
ATTORNEYS

UNITED STATES PATENT OFFICE.

FRIEDRICH WILHELM KASCH, OF AUSTIN, TEXAS.

WRENCH.

SPECIFICATION forming part of Letters Patent No. 433,794, dated August 5, 1890.

Application filed December 12, 1889. Serial No. 333,437. (No model.)

*To all whom it may concern:*

Be it known that I, FRIEDRICH WILHELM KASCH, of Austin, in the county of Travis and State of Texas, have invented a new and useful Improvement in Wrenches, of which the following is a full, clear, and exact description.

My invention relates to an improvement in wrenches, and has for its object to provide a tool especially adapted for a pipe-wrench, but also capable of use as a monkey-wrench.

A further object of the invention is to construct a wrench with practically two handles, one of which is capable of use as a lever to disengage the jaws from the pipe and to adjust the upper jaw to and from the lower jaw.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
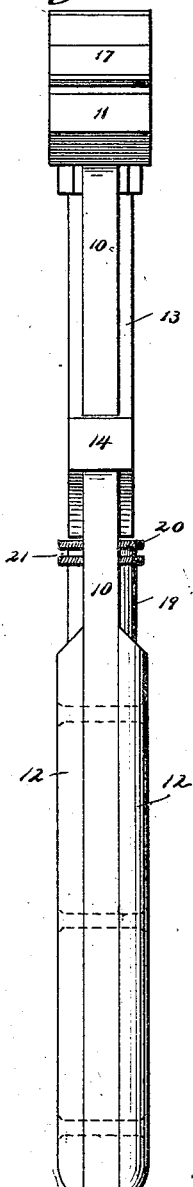
Figure 2:
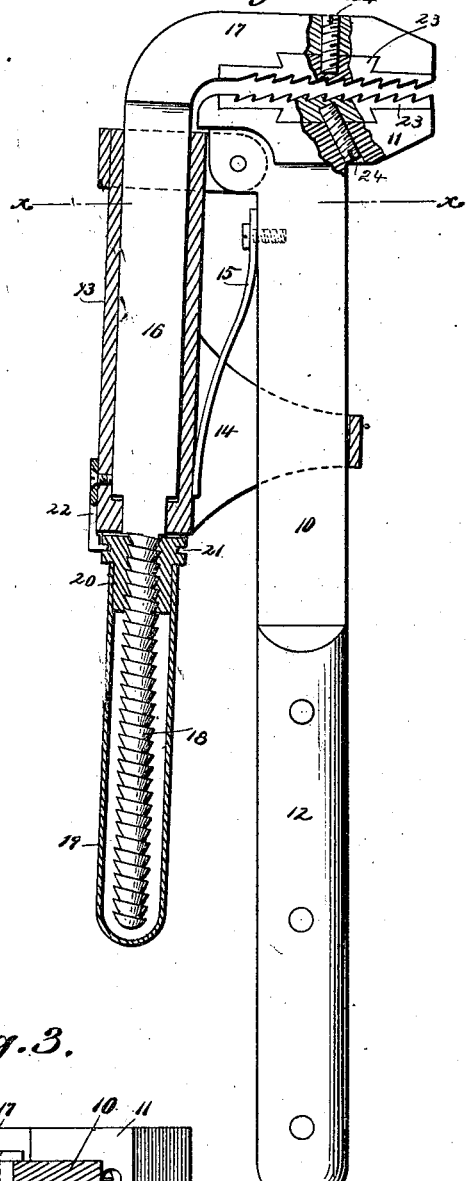
Figure 3:
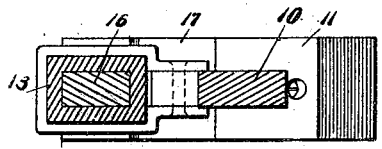

Figure 1 is an edge view of the wrench. Fig. 2 is a side elevation, partly in section; and Fig. 3 is a transverse section on line $x$ $x$ of Fig. 2.

In carrying out the invention the main shank 10 is preferably rectangular in cross-section, and has formed integral with its upper end a jaw 11, and to the lower extremity of said shank, preferably upon opposite sides, wooden strips 12 are attached, forming thereby a handle.

To the upper rear edge of the main shank 10, immediately beneath the heel of the jaw 11 thereon, the upper extremity of a sleeve 13 is hinged in such manner that the said sleeve will be capable of more or less swinging movement upon the main shank. This sleeve is rectangular in cross-section, and the opening in the lower end thereof is preferably reduced in width. To the forward side of the sleeve a yoke 14 is attached, which yoke encompasses the main shank 10 and limits the outward movement of the sleeve upon its hinged joint with the said main shank, and the said sleeve is normally held quite a distance from the main shank 10 and parallel therewith, through the medium of a spring 15, attached at one end to the main shank near its upper end, the other end of the said spring having a bearing against the sleeve near its lower extremity, as best illustrated in Fig. 2.

Within the sleeve 13 an auxiliary shank 16 is held to slide, which shank is provided at its upper end with a preferably integral jaw 17, the said jaw 17 being made to extend over the lower jaw 11, forming a portion of the main shank.

The auxiliary shank 16 is reduced at or near its center to pass through the lower contracted opening of the sleeve 13, and that portion of the shank extending below the sleeve is threaded, as illustrated at 18.

The threaded section 18 of the auxiliary shank 16 is covered by a tubular handle 19, which handle has fitted in its upper end a nut 20, capable of receiving and turning upon the said threaded section 18 of the auxiliary shank. The nut 20 is preferably made to project above the tubular handle 19, and is provided at its upper end with a circumferential groove 21, in which groove a tongue formed upon a clamping-plate 22 is inserted, the said clamping-plate being attached to the sleeve 13.

Each jaw is preferably provided with an attached toothed block 23, which blocks constitute the opposed toothed or clamping faces of the upper and lower jaws. The toothed blocks are preferably formed with a dovetail projection upon one face, which dovetail projections are made to snugly fit into dovetail recesses produced in the contiguous faces of the jaws, as illustrated in Fig. 2, the blocks after having been inserted in the recesses of the jaws, being held to place by means of set-screws 24, introduced through the jaws into said blocks.

It will be observed that as the sleeve 13 covers the auxiliary or movable shank 16 upon all four sides, grease, dirt, &c., cannot enter the sleeve to interfere with the free movement of the adjustable shank.

The shank 16 is adjustable vertically, so as to increase or decrease the distance between the upper and lower jaws to receive pipe of different sizes by the manipulation of the handle 19, which, through the medium of the nut 20, acts upon the screw portion of the shank. It will also be observed that the handle 19 forms a very convenient grasp for the hand in the operation of detaching the wrench from a pipe.

When the pipe has been placed between the jaws and said jaws brought firmly to a contact with said pipe, and when the pipe has been given a turn, or a partial turn, by the manipulation of the wrench, before a second turn is given to the said pipe the jaws may be readily detached therefrom by pressing in the handle 19 in the direction of the handle 12 of the main shank, whereby the two jaws are made to separate. This movement of the jaws is of great advantage when the wrench is to be detached from the pipe, as it ofttimes happens in turning a length of pipe that the teeth of the jaws become so embedded in the pipe that in endeavoring to laterally detach the wrench more or less of the teeth are broken. It is obvious that when the handle 19 is carried inward toward the main shank 10, the jaws will separate to such an extent as to enable the operator to remove the wrench from the pipe without injury to the teeth.

By causing the toothed surfaces of the jaws to be made detachable, should anything happen to the blocks carrying the teeth they may be readily removed and others substituted. It will be further observed that when the toothed blocks 23 are removed from the jaws the wrench may be used as a monkey-wrench to great advantage.

It will be observed that as the body of the main shank or the auxiliary shank of the wrench described is not threaded or otherwise weakened, it is capable of sustaining much more pressure than the shanks of wrenches of a like type. I desire it to be understood that I do not confine myself to the introduction of toothed blocks in the contiguous faces of the jaws or to the especial manner in which they are attached or secured, as the teeth may constitute an integral part of the jaws, or the inner faces of the said jaws may be made smooth.

Having thus described my invention, I claim as new and desire to secure by Letters Patent—

1. A wrench comprising a main shank having a jaw on its upper end or head, and provided at one side of its head with a swinging longitudinally-adjustable auxiliary shank having a jaw at its upper end, and an elongated longitudinally-extending rotary handle having a screw-connection at its upper or inner end with the lower end of said auxiliary shank, and extending at its outer or swinging end down below the head and alongside of the handle portion of the main shank, and adapted to be grasped simultaneously by the same hand grasping the main handle to open the jaws when pressed toward the main shank and to adjust the space between the jaws when rotated, substantially as set forth.

2. A wrench consisting in a main shank having a jaw at its upper end and a handle at its lower end, a sleeve pivoted to the main shank, a spring pressing it away therefrom, a sliding shank mounted in said sleeve and provided at its upper end with a jaw, and an elongated rotary handle having a screw-connection with the sliding jaw for adjusting it longitudinally, and extending downward below the lower ends of the sleeve and sliding jaw alongside of the main handle, both of said handles being adapted to be simultaneously grasped by a single hand of the operator, substantially as set forth.

3. A wrench consisting in the main shank having a jaw at its upper end and a handle at its lower end, a sleeve hinged to the said shank to swing toward and away therefrom, a longitudinally-adjustable shank having a jaw at its upper end extending down through the sleeve, and having a threaded lower portion and a rotary internally-threaded handle, into which said threaded portion extends, said rotary handle extending down alongside of the main handle and serving the twofold purpose of adjusting the adjustable shank longitudinally to set the space between the jaws and of rocking the said shank to open the jaws and release the article gripped, substantially as set forth.

4. A wrench consisting in the main shank having a jaw at its upper end and a handle at its lower end, a sleeve hinged to said shank to swing toward and away therefrom, a tubular handle connected at its upper end with the lower end of the sleeve to rotate thereon, and provided with internal threads at said upper end and extending downward alongside of the main handle, and a longitudinally-adjustable shank extending down through the sleeve into the said handle, threaded to engage the handle-threads, and provided at its upper end with a jaw, and a spring pressing the sleeve away from the main shank and throwing the movable jaw toward the fixed or main shank jaw, substantially as set forth.

5. The herein-described wrench, consisting in the main shank having a jaw at its upper end and a handle at its lower end, a sleeve hinged to said shank open at its ends and closed on all sides, a tubular handle closed at its lower end, connected at its upper internally-threaded end with the lower end of the sleeve to rotate thereon, a spring pressing the sleeve away from the main shank, and an adjustable shank extending down through the sleeve into the said handle and having exterior threads engaging the handle-threads, the said rotary handle extending down alongside of the main handle, substantially as set forth.

FRIEDRICH WILHELM KASCH.

Witnesses:
FREDERICK C. VON ROSENBERG,
CARL A. BOLLMANN.